(12) United States Patent
Adelsson et al.

(10) Patent No.: US 6,347,273 B1
(45) Date of Patent: Feb. 12, 2002

(54) PROCESS AND SYSTEM FOR CONTROLLING THE SPEED OF A VEHICLE

(75) Inventors: Per Adelsson, Nordenskiöldsgatan; Staffan Wendeberg, Andalen, both of (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 09/485,432
(22) PCT Filed: Aug. 11, 1998
(86) PCT No.: PCT/SE98/01452
  § 371 Date: Apr. 17, 2000
  § 102(e) Date: Apr. 17, 2000
(87) PCT Pub. No.: WO99/07571
  PCT Pub. Date: Feb. 18, 1999

(30) Foreign Application Priority Data

Aug. 11, 1997 (SE) ................................. 9702914

(51) Int. Cl.[7] .............................................. B60K 31/00
(52) U.S. Cl. ............................ 701/96; 701/93; 180/178
(58) Field of Search ............... 701/96, 93; 180/170–179

(56) References Cited

U.S. PATENT DOCUMENTS 4,706,195 A   11/1987   Yoshino et al.
5,493,302 A   2/1996   Woll et al.

FOREIGN PATENT DOCUMENTS

EP   0612 641   8/1994
WO   WO 95/01577   1/1995

*Primary Examiner*—Richard M. Camby
(74) *Attorney, Agent, or Firm*—Samuels, Gauthier & Stevens, LLP

(57) ABSTRACT

The present invention refers to a method to control the speed of a vehicle by means of a cruise control device, essentially by arranging the cruise control device in at least one of: a cruise control state (13), in which the speed of the vehicle is controlled preferably with regard to a selected constant speed ($V_{det}$), a retardation state (14), in which the speed of the vehicle ($V_{curr}$) is controlled towards a determined constant speed ($V_{det}$), an acceleration state (15), in which the speed alteration is achieved preferably manually, an inactive state (16), in which the system is temporary or permanently switched off, and a distance control state (17), in which substantially a distance of the vehicle to a vehicle ahead is controlled. The method further comprises the step of arranging the cruise control in a temporary state (18), in which a speed ($V_{curr}$) at transition time to this state is maintained.

8 Claims, 2 Drawing Sheets

PROCESS AND SYSTEM FOR CONTROLLING THE SPEED OF A VEHICLE

TECHNICAL FIELD

The present invention refers to a method to control the speed of a vehicle by means of a cruise control, substantially by setting the cruise control at least in one of: a cruise control state, in which the speed of the vehicle is controlled, preferably with regard to a selected constant speed; a retardation state, in which the speed of the vehicle is controlled towards the selected constant speed, an acceleration state, in which the speed variation is preferably manually controlled, a distance control state, in which mainly a vehicle's distance to another vehicle in the travel direction of the vehicle is controlled and an inactive state, in which the system is temporary or permanently switched off.

The invention also refers to a cruise control system.

BACKGROUND OF THE INVENTION

A cruise control is a convenience means in a motor vehicle to hold a constant speed during shorter or longer driving distances. Generally, the cruise control is switching on by actuating a special start of set button at a certain speed. The speed of the vehicle at the switch-on moment is stored in a memory and the cruise control controls the speed of the vehicle with respect to the stored value. The cruise control is switched off by means of a termination button or for example by actuating the brake or clutch petal. The cruise control can be restarted by actuating the start button at a certain speed or pressing a resume button, which restores the cruise control for the speed that it was initiated for before it was switched off.

A conventional cruise control system consists of a computer unit, which is connected to sensors, which for instance are provided to read and report the engine condition, the position of the accelerator, clutch and brake pedals and other relevant information to the computer unit. The computer unit is also connected to means for controlling the motor, for example by decreasing or increasing the fuel feed to the motor. Additionally, the computer unit is equipped with memory units for storing instructions and other temporary information.

There are different devices to determine the distance to an object or its speed. Examples of such devices are laser cameras, cameras and radar. The rapid development which the radar technique has resulted in dimension reduction for radar equipments including equipment for signal processing, in such a degree that also different types of vehicles, such as private cars, trucks and buses can be equipped with a radar equipment, for example as an extra precautionary measure, for navigation objectives etc.

There are also cruise control systems, in which a radar is connected to the cruise control system, which for example provides the system with distance or speed with regard to a vehicle ahead. This system allows controlling the speed of the vehicle with regard to a distance to the vehicle ahead. A problem with this cruise control system is that it lacks a possibility, specially in an intelligent way stop an unwanted acceleration of the vehicle in a safe way.

THE OBJECT OF THE INVENTION AND MOST IMPORTANT FEATURES

The main objective of the invention is to provide an improved cruise control arrangement, which essentially with regard to the speed of another vehicle, preferably in the travelling direction of the vehicle, controls the speed of the vehicle so that no unwanted acceleration can occur.

Above-mentioned objective is achieved through a method, according to the preamble, which sets the cruise control in an additional state in which the speed at the transition time to this state is maintained.

A cruise control system according to the invention includes a computer unit, sensors and control devices. The computer unit when activated controls the speed of the vehicle by means of the control devices and with regard to a selected speed as well as information obtained from the sensors regarding the distance and/or speed of another vehicle ahead. By indication from a distance and/or speed sensor that the vehicle ahead departures from the sensing field of the sensor and that no other vehicle is within the sensing field, the computer unit is arranged to assume a temporary state, in which the speed of the vehicle at the changeover to said temporary state is maintained.

DESCRIPTION OF THE DRAWINGS

The invention will now be described in more detailed and with reference to a non limiting embodiment shown on attached drawings, in which.

SPEED REFERENCES $V_{det}$ the speed which the cruise control should maintain; Selected by the driver.

$V_{min}$ minimum speed the cruise control should maintain. Predetermined by the producer.

$V_{max}$ maximum speed which the cruise control should maintain. Predetermined by the producer.

$V_{curr.}$ the current speed of the vehicle.

$V_{rel}$ the relative speed of the vehicle, for example relative to an object or another vehicle.

DESCRIPTION OF THE EMBODIMENT

Figure 1:
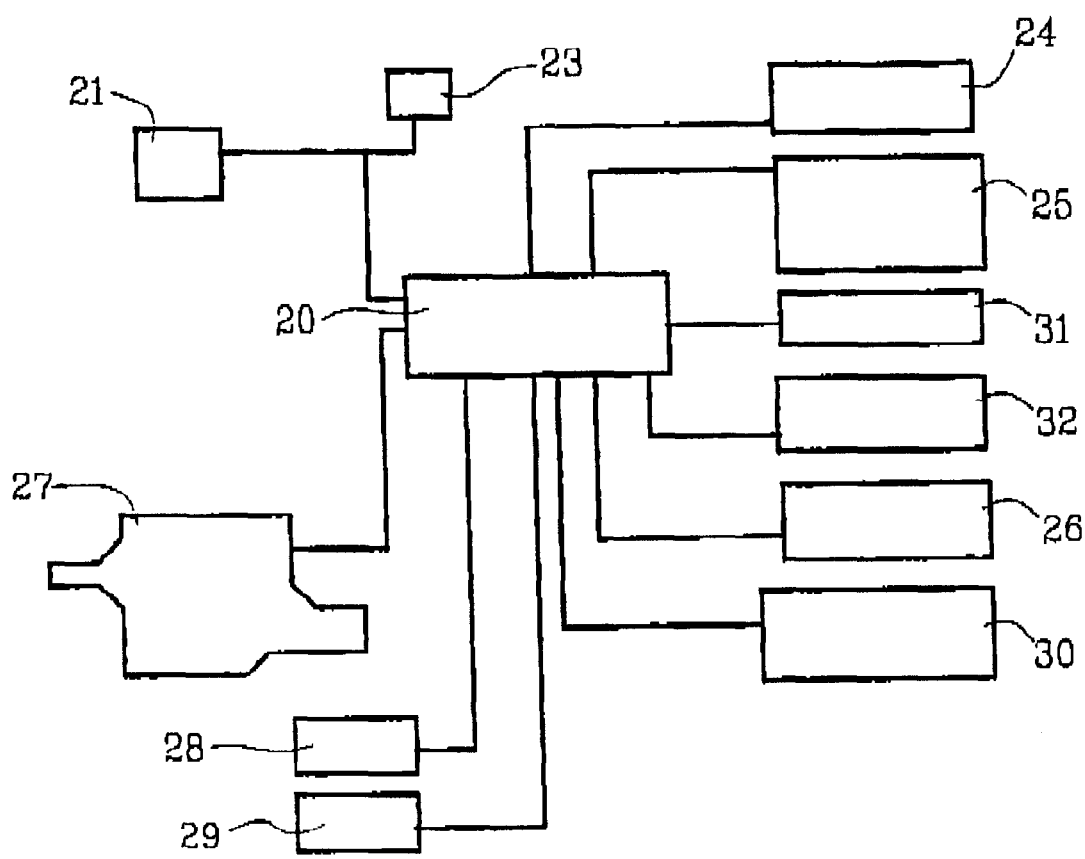
FIG. 1 shows a block diagram over a cruise control system according to the present invention.

FIG. 1 shows a very schematic embodiment of a so called intelligent cruise control system. The system mainly includes a computer unit 20 connected to a number of sensors, such as a distance and/or speed sensor 21, a curve sensor or a possible curve sensor function from a unit 23, switch 24, sensors 25, 26 for accelerator and clutch pedal positions, respectively, and speed sensor 31. The computer unit can directly or indirectly control the motor 27 and eventually actuate the brakes and gearbox by means of control devices 32, 28 and 29, respectively. The system is also arranged to communicate with the driver via an appropriate interface 30. Preferably, the speed is given by means of a distance or a relative speed with respect to an object detected by the sensors 21. The curse sensor 23 provides the computer unit 20 with information on the appearance of the road, for example the curvaceous in front of the vehicle or the like.

By the computer unit bing directly or indirectly connected to the motor and other units is meant that the control of these units, for example a device for fuel feed, brakes and (automatic) gearbox is carried out directly by the computer unit via the control devices or indirectly by supplying information to the existing control units, for example the control unit, ABS-control unit or the anti-spin unit and so on.

Obviously, the cruise control system may be integrated in the vehicle computer or another unit, if one is provided.

In that following example a vehicle that is provided with a device according to the present invention is referred to with A and a vehicle ahead with B.

Figure 2:
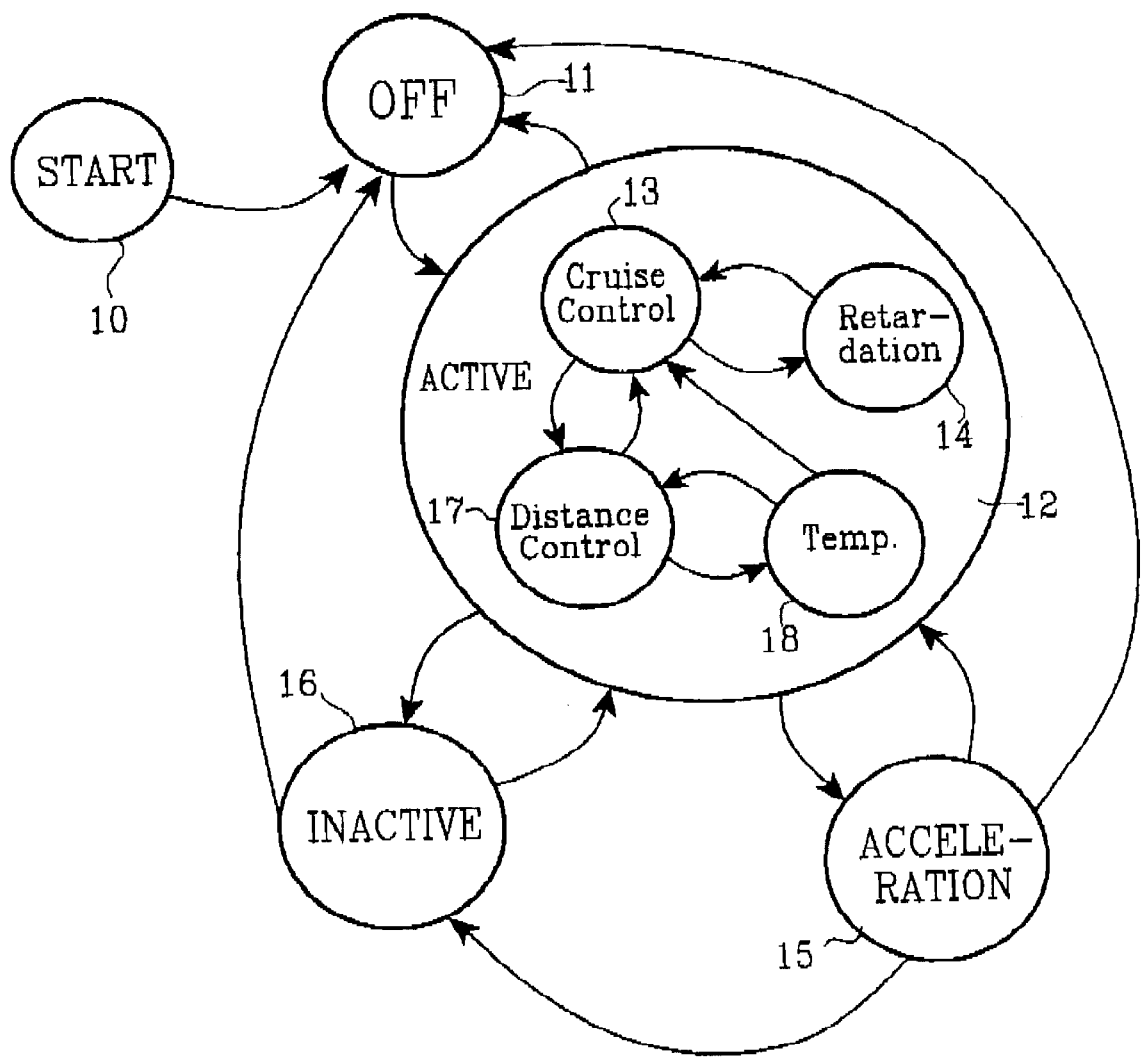
FIG. 2 shows a constitutional diagram for states in a cruise control system, according to the invention.

An intelligent cruise control system includes a number of states, which are illustrated in FIG. 2. The states are:

OFF, 11, i.e. the system is switched off and inactive, for example because the driver deliberately has switched off the cruise control or the cruise control has not been activated, for instance after starting the vehicle.

ACTIVE, 12, which consists of a number of sates:
cruise control 13, i.e. when the system continuously regulates the speed of the vehicle to keep a constant speed,
retardation 14, i.e. when the speed exceeds the determined speed, for example when the vehicle travels downhill and begins to accelerate,
the distance control state 17, in which mainly the distance of the vehicle a relative to another vehicle B ahead is controlled, and
a temporary state 18, according to the invention, which is described in more detail below.

ACCELERATION 15, i.e. the system is active but the driver has the control by actuating accelerator and increasing the speed ($V_{curr}>V_{det}$).

INACTIVE 16, a state in which the system has been activated and then inactivated, for example by actuating the brake or clutch pedals or if the driver switches off the cruise control. In this state the cruise speed $V_{det}$ is kept in the memory.

The cruise control is switched off as long as the vehicle is not started. After the start 10 of the vehicle, the cruise control assumes OFF-state where the cruise control is inactivated until it is activated. The cruise control is activated by the driver at a speed $V_{det}$ for example by means of gearbox is carried out directly by the computer unit via the control devices or indirectly by supplying information to the existing control units, for example the control unit, ABS-control unit or the anti-spin unit and so on. Obviously, the cruise control system may be integrated in the vehicle computer or another unit, if one is provided.

In that following example a vehicle that is provided with a device according to the present invention is referred to with A and a vehicle ahead with B.

An intelligent cruise control system includes a number of states, which are illustrated in FIG. 2. The states are:

OFF, 11, i.e. the system is switched off and inactive, for example because the driver deliberately has switched off the cruise control or the cruise control has not been activated, for instance after starting the vehicle.

ACTIVE, 12, which consists of a number of states:
cruise control 13, i.e. when the system continuously regulates the speed of the vehicle to keep a constant speed,
retardation 14, i.e. when the speed exceeds the determined speed, for example when the vehicle travels downhill and begins to accelerate,
distance control state 17, in which mainly the distance of the vehicle A relative to another vehicle B ahead is controlled, and
a temporary state 18, according to the invention, which is described in more detail below.

ACCELERATION 15, i.e. the system is active but the driver has the control by actuating accelerator and increasing the speed ($V_{curr}>V_{det}$).

INACTIVE 16, a state in which the system has been activated and then inactivated, for example by actuating the brake or clutch pedals or if the driver switches off the cruise control. In this state the cruise speed $V_{det}$ is kept in the memory.

The cruise control is switched off as long as the vehicle is not started. After the start 10 of the vehicle, the cruise control assumes OFF-state where the cruise control is inactivated until it is activated. The cruise control is activated by the driver at a speed $V_{det}$, for example by means of a switch. $V_{det}$ is stored in the cruise control's temporary memory. For security reasons, the cruise control should be activated manually by the driver. Generally, the cruise control is not activated if the speed of the vehicle is lower than $V_{min}$ (or higher than $V_{max}$). This is controlled by the cruise control's computer unit in memory of which $V_{min}$ ($V_{max}$) is pivoted. In its active state 12, the cruise control controls the speed of the vehicle, for example through continues accelerations or engine brakes, to increase and decreasing, respectively, the speed so that the speed of the vehicle $V_{curr}$ is so close to $V_{det}$ as possible. When an undesired speed increase, i.e. a speed increase without the driver having accelerated, e.g. due to acceleration in a downhill, the system assumes the retardation state 14 to reduce $V_{curr}$ to $V_{det}$. Braking is achieved through different methods, for example by reducing fuel feed to the motor. Under the time $V_{curr}$ is compared to the actual speed $V_{det}$ until $V_{det}$ is reached, whereby the system assumes the cruise control state 13.

By the distance control state 17 is meant that the computer unit receives information from the sensor 21, for example about the vehicle B ahead of the vehicle A and in its travel direction; then the computer unit will try to control the speed, for example by (motor) braking or accelerating, so that the distance between the vehicle A and vehicle B does not falls below a determined distance $d_s$. The cruise control can however reduce the speed of the vehicle, while the selected speed $V_{det}$ is kept in the memory. The changeover from the cruise control 13 to the distance control 17 happens if the vehicle B is detected and the vehicle A must decelerate to retain the distance $d_g$. This state is the same as the retardation state 14, but here, the system also takes the distance $d_g$ into consideration. If vehicle B increases the distance, i.e. accelerates, the cruise control state 13 is assumed and the system operates as a conventional cruise control.

The main difference between a conventional intelligent cruise control system and the cruise control system according to the present invention is in the active state 12, in which the cruise control can assume the temporary state 18. If vehicle B is lost by the sensor, i.e. if vehicle B disappears from the sensing field of the sensor, for example if any of vehicles A or B drives out on an exit road, changes lane or vehicle B accelerates and no other objects are within the sensing field of the sensor 21, a changeover from the distance control state 17 to the temporary state 18 is obtained, here the cruise control maintains the actual $V_{curr}$ speed and prevents a possible acceleration. In this state the vehicle A may self accelerate only if certain conditions are fulfilled, for example if there is no other vehicle within the safe distance. However, the cruise control transits to the distance control 17 if the distance between the vehicle A and vehicle B decreases or to cruise control 13, for example if the driver presses the accelerator or resumes the cruise control system.

When the cruise control is in its active state 12, it can assume the acceleration state 15, whereby the cruise control temporarily leaves the control to the driver through acceleration. When acceleration is ended, the system assumes its active state 12 and the cruise control controls the actual speed $V_{curr}$ and if $V_{curr} > V_{det}$ the speed is decreased.

The cruise control may be inactivated manually by the driver, for example by means of the same switch that activates it or by actuating the brake or clutch pedal. The cruise control remains in this state 16 until the driver resumes it. In this position the cruise control is activated if $V_{curr}$ is higher than $V_{min}$ or lower than $V_{max}$. In certain systems the cruise control is resumed automatically, for example after a gear shift.

The cruise control can transit from the inactive, active and acceleration states to OFF state 11, if the driver switches off the cruise control function, for example by means of the same switch that activated it. Of coarse other state changes between the states than above-mentioned or a combination of them may occur.

In an embodiment, the driver is informed by the vehicle A about the relative speed to the vehicle B, so that at a changeover to the distance control, the driver can brake or perform an evasion action, for example overtaking, whereby the system hands over the control.

The cruise control system according to invention is particularly suitable for use in larger vehicles, such as trucks, and gives the advantage of stopping acceleration when the cruise control is activated, for example by driving out to an exit road with a sharp curve, in which the truck may tip over. However, this is not a limitation and the system can be implemented in privet cars, buses and other vessels.

In an advantageous embodiment the system takes over the control of the fuel feed, controls the torque and/or possible retarders to provide brake torque. In another embodiment, instead of the distance ds, a time gap $t_g$, which gives the distance between the vehicles in a time period can be used.

In an embodiment, the sensor 21 is preferably a radar unit in the front of the vehicle so arranged that the radar is exposed to minimum of vibration. It is possible that, for example in a truck with a suspended cabin to place the radar in an area outside the cabin's exterior, for example in connection with the headlights. The driver side is a suitable side to cover a sufficient area.

Although, the system according to present invention does not function as an anti-collision or collision radar system, it can however be a part or act as a part of such a system.

While we have illustrated and described a preferred embodiments of the invention, it is obvious that several variations and modifications within the scope of the attached claims may occur.

What is claimed is:

1. A method to control the speed of a vehicle by means of a cruise control device, which communicates with at least one detector for scanning a field in front of the vehicle, the cruise control device being arranged to assume at least the following control states:
   a first state, in which the speed of the vehicle ($V_{curr}$) is controlled with regard to a selected constant speed ($V_{det}$),
   a second state, in which the speed of the vehicle ($V_{curr}$) is controlled with regard to a speed at which a distance ($d_s$) to at least one nearest vehicle in front is maintained substantially constant,
   third state, in which the speed of the vehicle ($V_{curr}$) is maintained substantially constant, the cruise control further being arranged to change from said first state to said second state when a vehicle in front is detected in the sensing field of the detector,
   wherein the cruise control assumes the third state from said second state when the vehicle in front departs from the sensing field of the detector, and that the cruise control device remains in the third state until:
   the driver takes over the control of the speed of the vehicle, or
   the detector detects that the vehicle in front is within the sensing field of the detector whereby the cruise control device assumes the second state from the third state.

2. A method according to claim 1, wherein the cruise control device changes to the first state from the third state.

3. A method according to claim 2, wherein the transition occurs if the system is activated manually.

4. A cruise control system of a vehicle, including a computer unit, detectors and control devices, which computer unit, when activated, is arranged to control the speed of the vehicle by means of the control devices with regard to a selected speed and information received from the detector, said information containing a distance to and/or speed of another vehicle in front, the cruise control being arranged to assume at least following control states:
   a first state, in which the speed of the vehicle ($V_{curr}$) is controlled with regard to a selected constant speed ($V_{det}$),
   a second state, in which the speed of the vehicle ($V_{curr}$) is controlled with regard to a speed at which a distance ($d_s$) to at least one nearest vehicle in front is maintained substantially constant,
   a third state, in which the speed of the vehicle ($V_{curr}$) is maintained substantially constant, the cruise control further being arranged to change from said first state to said second state when a vehicle in front is detected in the sensing field of the detector, wherein the computer unit is further arranged to put the cruise control in the third state from said second state when the vehicle in front departs from the sensing field of the detector, and that the cruise control remains in the third state until:
   signals are received from a pedal detector that the driver has taken over the control of the speed of the vehicle, or
   the detector signals the computer unit that a vehicle in front is detected within the sensing field of the detector whereby the computer unit instructs the cruise control to assume the second state from the third state.

5. The system according to claim 4, wherein the detector for distance and/or speed is a radar unit.

6. The system according to claim 4, wherein the detector is located in a front section of the vehicle, preferably outside the vehicle cabin.

7. The system according to claim 4, wherein the system is connected to a detector for indication of appearance of a road.

8. The system according to claim 4, wherein the distance and/or speed detector is arranged to indicate the distance with a time difference.

* * * * *